(12) United States Patent
Martine et al.

(10) Patent No.: US 7,916,859 B2
(45) Date of Patent: Mar. 29, 2011

(54) SYSTEM AND METHOD FOR OBTAINING TELECOMMUNICATION ACCESS NUMBERS

(75) Inventors: Michael J. Martine, Chapel Hill, NC (US); John W. Miller, Suwanee, GA (US); Gregory J. Boss, American Fork, UT (US); Kevin C. McConnell, Austin, TX (US); Rick A. Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 1386 days.

(21) Appl. No.: 11/345,925

(22) Filed: Feb. 2, 2006

(65) Prior Publication Data
US 2007/0189499 A1  Aug. 16, 2007

(51) Int. Cl.
*H04M 1/00* (2006.01)
*H04M 3/00* (2006.01)
(52) U.S. Cl. .................. 379/355.02; 379/355.1
(58) Field of Classification Search .. 379/355.01–355.1; 455/460, 564
See application file for complete search history.

(56) References Cited

U.S. PATENT DOCUMENTS

| | | | |
|---|---|---|---|
| 5,917,904 A | 6/1999 | Theis | |
| 6,292,557 B1 * | 9/2001 | Gabara | 379/355.08 |
| 6,405,059 B2 | 6/2002 | De Crouy-Chanel | |
| 6,490,449 B1 * | 12/2002 | Thibert et al. | 455/433 |
| 6,567,675 B1 | 5/2003 | Rosen et al. | |
| 6,717,936 B1 | 4/2004 | Srinivasan | |
| 6,766,017 B1 * | 7/2004 | Yang | 379/355.02 |
| 6,940,965 B1 | 9/2005 | Arnold et al. | |
| 6,947,544 B2 * | 9/2005 | Yamartino | 379/355.08 |
| 6,980,642 B1 * | 12/2005 | Hung et al. | 379/355.05 |
| 7,113,585 B1 * | 9/2006 | Breckenridge | 379/356.01 |
| 2006/0172777 A1 * | 8/2006 | Klein et al. | 455/564 |

OTHER PUBLICATIONS http://www.fonefinder.net.
http://www.whitepages.com.

* cited by examiner

*Primary Examiner* — Quoc D Tran
(74) *Attorney, Agent, or Firm* — William H. Steinberg; Robert C. Rolnik; David A. Mims

(57) ABSTRACT

A method for determining a user intended number from a partial phone number includes steps for receiving a partial phone number, determining whether the partial phone number corresponds with at least one database number based on at least one selected criteria list and performing a system action based on the determination. The method may include prioritizing a list of database numbers that correspond to the partial number.

20 Claims, 5 Drawing Sheets

SYSTEM AND METHOD FOR OBTAINING TELECOMMUNICATION ACCESS NUMBERS

FIELD OF INVENTION

The present invention generally relates to mobile communication. More specifically, the invention relates to determining telecommunication access numbers at a mobile communication device using a partial number.

BACKGROUND OF THE INVENTION

With current telephone technology, a user often needs to dial seven digits to reach a party within the same area code. Because of this, many cell phone users have their cell phones programmed with only the seven digits, leaving off the area code. This is problematic when the cell phone user travels outside the phone's assigned home area code. Currently, cellular networks interpret numbers not including an area code to be placed within the current area code regardless of the area code associated with the cellular phone. This leads to the widespread problem of receiving "wrong number" calls.

Another problem that often arises for cell phone users when they are outside their home range area code, is not knowing the area code of the location that they are currently traveling through. In such circumstances, the user may guess at the area code. In a large metropolitan area having several assigned area codes, trying to determine the appropriate area code may be difficult. Further, guessing at an area code wastes time and valuable cell phone minutes.

Another problem often encountered by people is having, or remembering, only a portion of a telephone number that they wish to reach. With only a partial number, information services is of little help, especially if the caller does not know the location of the party they are trying to reach It is therefore desirable to provide a method and system for determining a user intended phone number that overcomes the limitations, challenges, and obstacles described above.

SUMMARY OF THE INVENTION

One embodiment of the present invention provides a method for determining a user intended number from a partial phone number. The method includes steps for receiving a partial phone number, determining whether the partial phone number corresponds with at least one database number based on at least one selected criteria list and performing a system action based on the determination.

Another embodiment of the present invention provides a computer usable medium including a program for determining a user intended number from a partial phone number. The computer usable medium includes computer readable code for receiving a partial phone number, computer readable code for determining whether the partial phone number corresponds with at least one database number based on at least one selected criteria list and computer readable code for performing a system action based on the determination.

Yet another embodiment of the present invention provides a system for determining a user intended number from a partial phone number. The system comprises means for receiving a partial phone number, means for determining whether the partial phone number corresponds with at least one database number based on at least one selected criteria list and means for performing a system action based on the determination.

The aforementioned and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof

DETAILED DESCRIPTION OF THE PRESENT INVENTION

Figure 1:
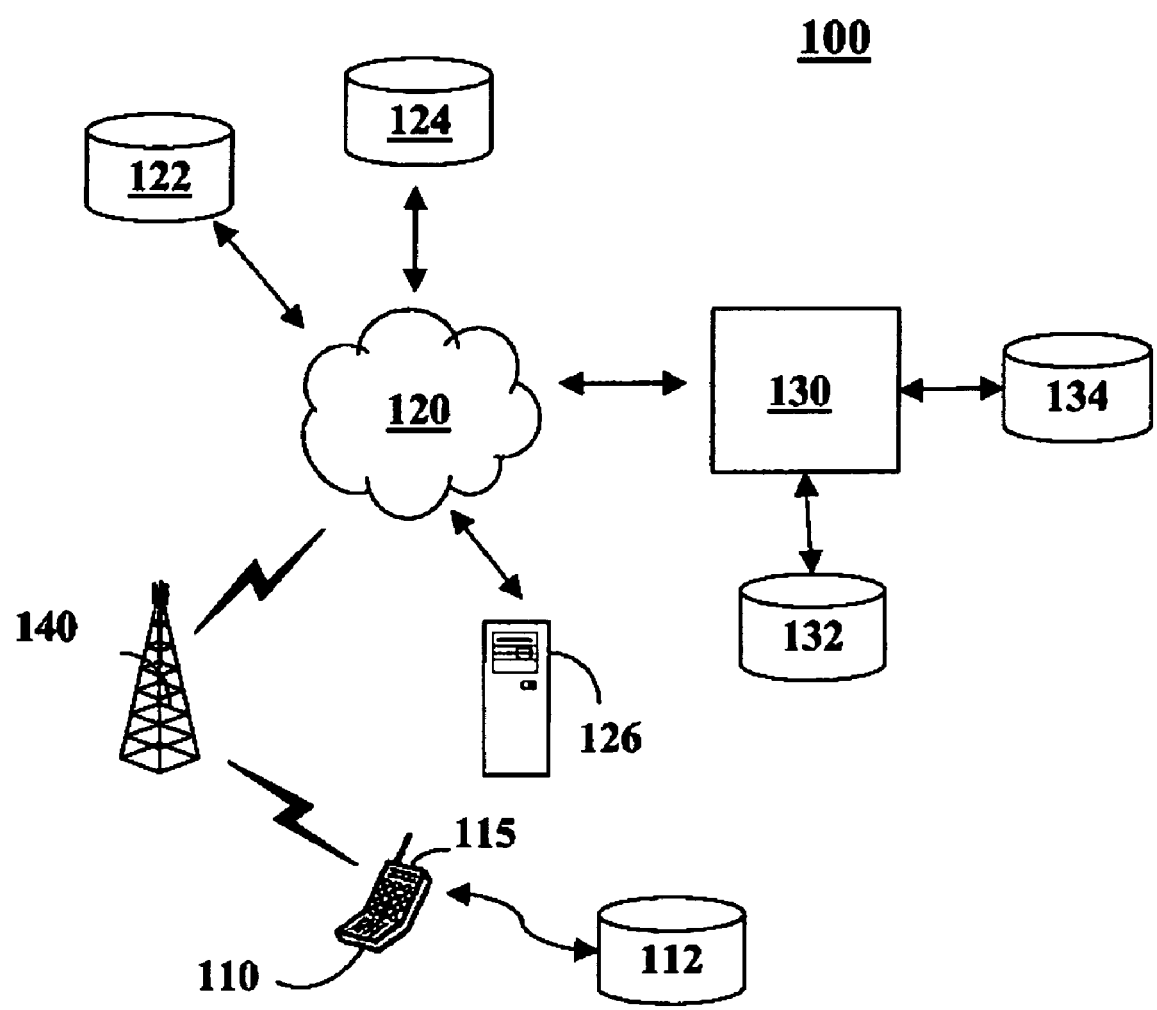
FIG. 1 is a schematic diagram of one embodiment of a system for determining a user intended number in accordance with one aspect of the invention.

FIG. 1 illustrates an exemplary network system 100. Network system 100 is illustrative only, and is not an architectural limitation for the practice of this invention. Network system 100 may include permanent connections, such as wire or fiber optic cables, or temporary connections made through telephone connections. FIG. 1 illustrates one embodiment of a system for determining a user intended number in accordance with the present invention at 100.

System 100 includes communication device 110, one or more communication networks 120; one or more land networks 130; and one or more wireless carrier systems 140. System 100 may include additional components not relevant to the present discussion.

In one embodiment, communication device 110 is implemented as a mobile communication device equipped with suitable hardware and software for transmitting and receiving voice and data communications. In one embodiment, communication device 110 includes hardware and or software for determining user intended numbers. In one embodiment, communication device 110 is a cellular phone such as, for example, an analog, digital, dual-mode, dual-band, multi-mode or multi-band cellular phone. In one embodiment, communication device 110 includes a display 115. In another embodiment, mobile communication device 110 is implemented as a personal digital assistant (PDA). In yet another embodiment, communications device 110 is implemented as a computer. Communication device 110 includes at least one local database 112. Local database 112 may be used to store files such as, for example, telephone numbers, incoming and outgoing phone logs, email logs, and the like as are well known in the art.

Communication device 110 sends and receives radio transmissions from wireless carrier system 140. Wireless carrier system 140 is implemented as any suitable system for transmitting a signal from a mobile communication device 110 to communication network 120.

Communication network 120 includes services from one or more mobile telephone switching offices and wireless networks. Communication network 120 connects wireless carrier system 140 to land network 130. Communication network 120 is implemented as any suitable system or collection of systems for connecting wireless carrier system 140 to communication device 110 and land network 130. In one embodiment, communication network 120 includes a telecommunications server 126. Server 126 includes hardware and/or software for implementing a method for determining user intended numbers. In one embodiment, communication network 120 is in communication with a plurality of databases 122, 124. Databases 122, 124 may be, for example, residential or business telephone number directory databases, or Internet search engines.

In one embodiment, land network 130 is a public-switched telephone network (PSTN). In another embodiment, land network 130 is implemented as an Internet protocol (IP) network. In other embodiments, land network 130 is implemented as a wired network, an optical network, a fiber network, other wireless networks, or any combination thereof. Communication network 120 and land network 130 connect wireless carrier system 140 to communication device 110. In one embodiment, land network 130 is in communication with a plurality of databases 132, 134. Databases 132, 134 may be, for example, telecommunication databases such as residential or business telephone number directory databases.

Figure 2:
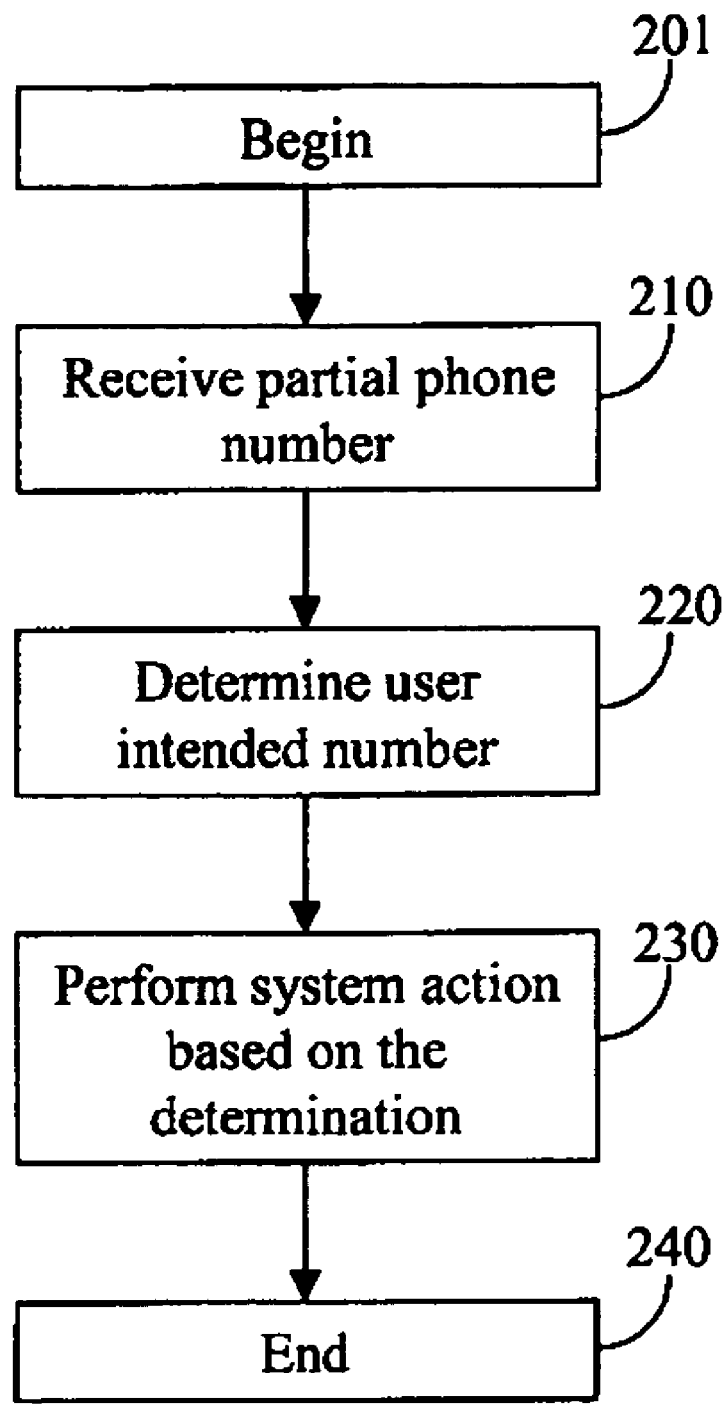
FIG. 2 illustrates a flowchart of one embodiment of a method for determining a user intended number in accordance with the present invention.

FIG. 2 illustrates a flowchart of one embodiment of a method 200 for determining a user intended number from a partial phone number. In one embodiment, method 200 may be implemented using system 100. Method 200 begins at step 201.

A partial phone number is received at step 210. A partial phone number is a telephone number missing at least one digit for complete and accurate delivery of the telephone call. In one embodiment, the partial phone number is a seven digit number missing the area code. Alternatively, the partial phone number contains the last four digits of a telephone number. In another embodiment, the partial phone number is missing the correct country of an international telecommunication phone number. In other embodiments, the partial telephone number is at least two consecutive numbers of a user intended number. In one embodiment, the partial phone number is received at a mobile communication device via input by a user.

At step 220, a determination is made whether the partial phone number corresponds to a user intended telephone number. The determination is made by comparing the partial phone number to telephone numbers in one or more user selected databases. In one embodiment, the determination is made at the mobile communication device 110.

In one embodiment, the user selected databases to be searched include an address book, an incoming phone log list and an out going phone log list of mobile communication device 110. In one embodiment, the address book is an electronic or machine readable phone book. In another embodiment, the user selected database may also include an email database located on mobile communication device 110. In still other embodiments, the user selected database includes a database of telephone numbers located within the home area code of the mobile communication device and/or within the current area code of the mobile communication device. The user selected databases may include residential and business telephone number databases.

In one embodiment, the user selected databases are prioritized as to the order that each database is searched for the user intended number. In one embodiment, the priority is predetermined. In another embodiment, the priority is determined by the user. In an example, the user may configure the method to search the mobile communication device 110 address book first, the outgoing phone log second, and the incoming phone log third for the intended number. In this example, the prioritization list may include additional user selected databases to search if the number is not found in the first three databases. The prioritization list may include any number of databases to search or may include all available user selected databases.

In an example, a seven digit number entered by the user is compared to telephone numbers in the address book for the most likely area code to append to the seven digit partial phone number. In another embodiment, the outgoing call log of the mobile device may be queried for an area code of a number previously dialed from the mobile device that matches the partial phone number. Alternatively, the incoming call log may be queried in the same manner. In another example, many cellular phones and handheld mobile communication devices send and receive emails and a text query of stored emails on the mobile communication device searches for matches to the partial phone number to determine the corresponding area code. In another embodiment, the partial phone number is compared to text message SMS and MMS logs on the mobile communication device.

In another embodiment, the queries of address book, logs, and email databases takes place at a telecommunications server 126. In this embodiment, the mobile communication device 110 transmits the partial phone number to the telecommunications server where user selected databases are queried. In one embodiment, the query results are sent back to the mobile communication device. Alternatively, the query results are acted upon automatically at the telecommunications server.

In another embodiment, the telecommunications server queries other telecommunications databases to determine a number corresponding to the partial phone number. For example, the telecommunications server may query a wireless roaming database, often an HLS database, to determine whether a cellular phone corresponding to the partial phone number is active in the geographic area of the user. In this example, the user may be attempting to dial the cell phone of a visiting acquaintance from another state and the telecommunications server matches the roaming cell phone number to the partial phone number dialed.

In another embodiment, a business directory database is queried. For example, the telecommunications server may access a regional or national database of businesses. Alternatively, a residential directory may be queried for an individual's telephone number based on the partial phone number. In another embodiment, the user's home area code or current area code may be assigned to the partial phone number.

Based upon the determination, at step 220, that the partial phone number corresponds to a phone number found in a user selected database, a system action is performed, step 230. In one embodiment, the system action comprises dialing the complete phone number corresponding to the partial phone number to connect the mobile communication device to the intended number. In one embodiment, dialing the determined user intended number is performed automatically based on the determination. In another embodiment, the determined user intended number is presented to the user. The determined user intended number may be presented to the user as a text display or audibly. In the embodiments where the determined number is presented to the user, the user then makes the determination to dial the number to connect to the determined number. Method 200 ends at step 240.

Figure 3:
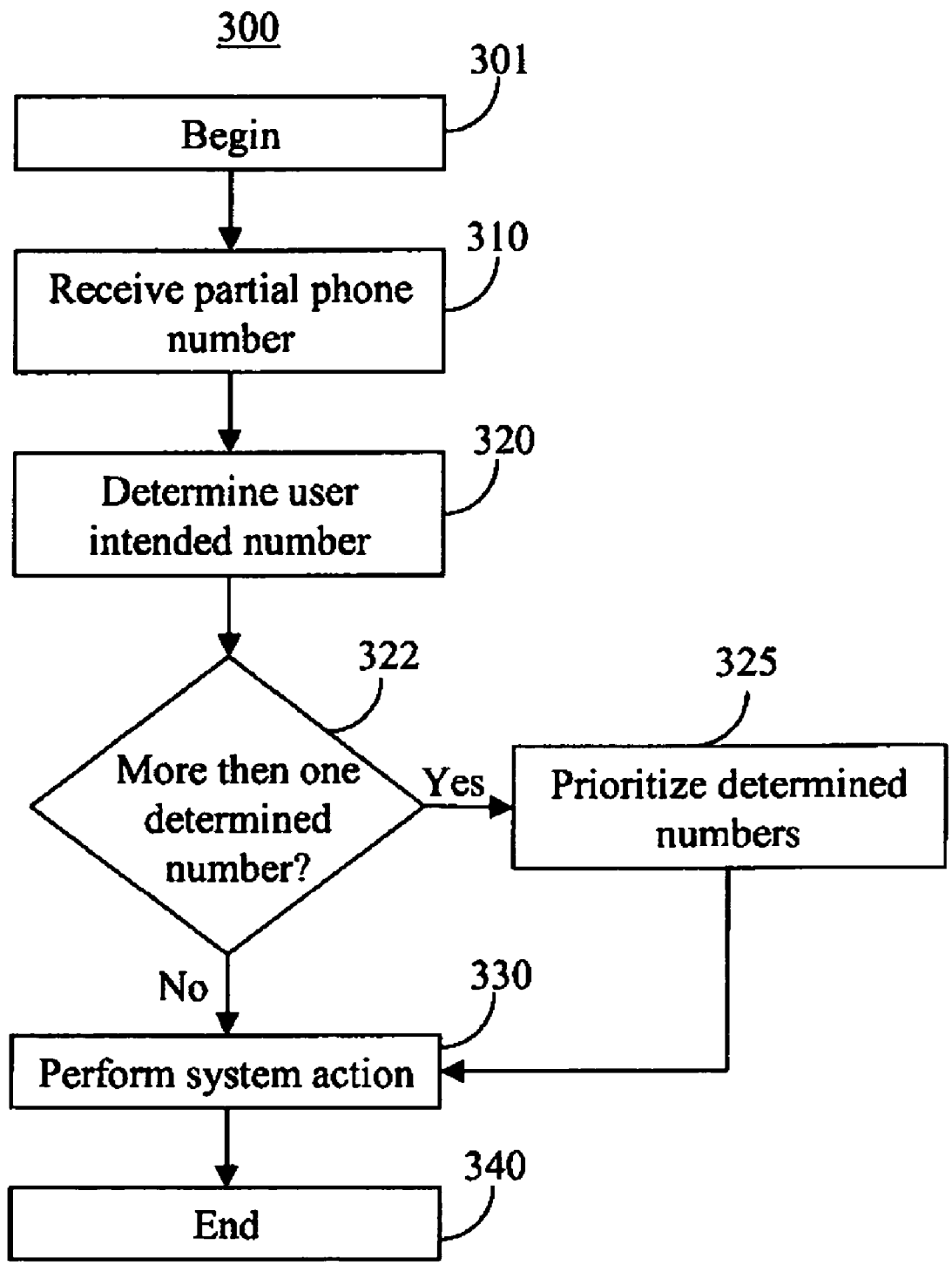
FIG. 3 illustrates a flowchart of another embodiment of a method for determining a user intended number in accordance with the present invention.

FIG. 3 illustrates another embodiment of a method 300 for determining a user intended number from a partial phone number. In one embodiment, method 300 may be implemented using system 100. Method 300 begins at step 301.

A partial phone number is received at step 310. In one embodiment, step 310 is implemented as in step 210. At step 320, a determination is made whether the partial phone number corresponds to a user intended telephone number. In one embodiment, step 320 is implemented as in step 220.

During the performance of step 320, the search of the user selected databases may return more than one number that matches the partial phone number provided in step 310. In one embodiment, at step 322, a determination is made as to whether more than one number was determined to match the partial number. If, at step 322, it is determined that only one number corresponding to the partial phone number is found, method 300 continues to step 330. In one embodiment, step 330 is implemented as in step 230.

However, if, at step 322 a determination is made that more than one number corresponds to the partial number, method 300 continues to step 325. At step 325, the determined numbers are prioritized. A user may configure method 300 to prioritize multiple returned numbers in order to provide a list of numbers in the order of the number most likely to be the intended number to the least likely to be the intended number. In one embodiment, the prioritization is determined based on the search priority of the user selected databases. In an example, the priority list for the determined numbers corresponds with the order that the databases were searched.

For example, a predetermined search priority of the databases comprises searching the mobile communication device address book then the stored emails. In this example, any number found in the address book would be prioritized over any number found in the email database. For example, during a search for an intended number matching a partial phone number of 933-3333, a number with an area code of 404 was found in the user address book and a number with a 312 area code was found in the stored emails. Based on the predetermined priority list the 404-933-3333 number was given priority over the 312-933-3333 number.

Those with skill in the art will recognize that there are other methods for establishing priority of the determined phone numbers. In another embodiment, selection criteria in addition to the database location are used to establish priority. For example, when multiple corresponding numbers are found in a call log, the most recent corresponding number is given a higher priority. Alternatively, the number with the greater frequency in the call log may be assigned a higher priority. In another embodiment, a corresponding number found in both the address book and the call logs be given higher priority over a number found in only one database.

Method 300 continues to step 330 upon the prioritization of the determined numbers. At step 330 a system action is performed. In one embodiment, step 330 is implemented as in step 230.

In another embodiment, the system returns a prioritized list of possible intended numbers to the user. In this embodiment, the user then selects the correct number from the supplied list and the call is connected.

In other embodiments where more than one number is determined at step 320, a list of the determined numbers are sent to the user without being prioritized. Method 300 ends at 340.

Figure 4:
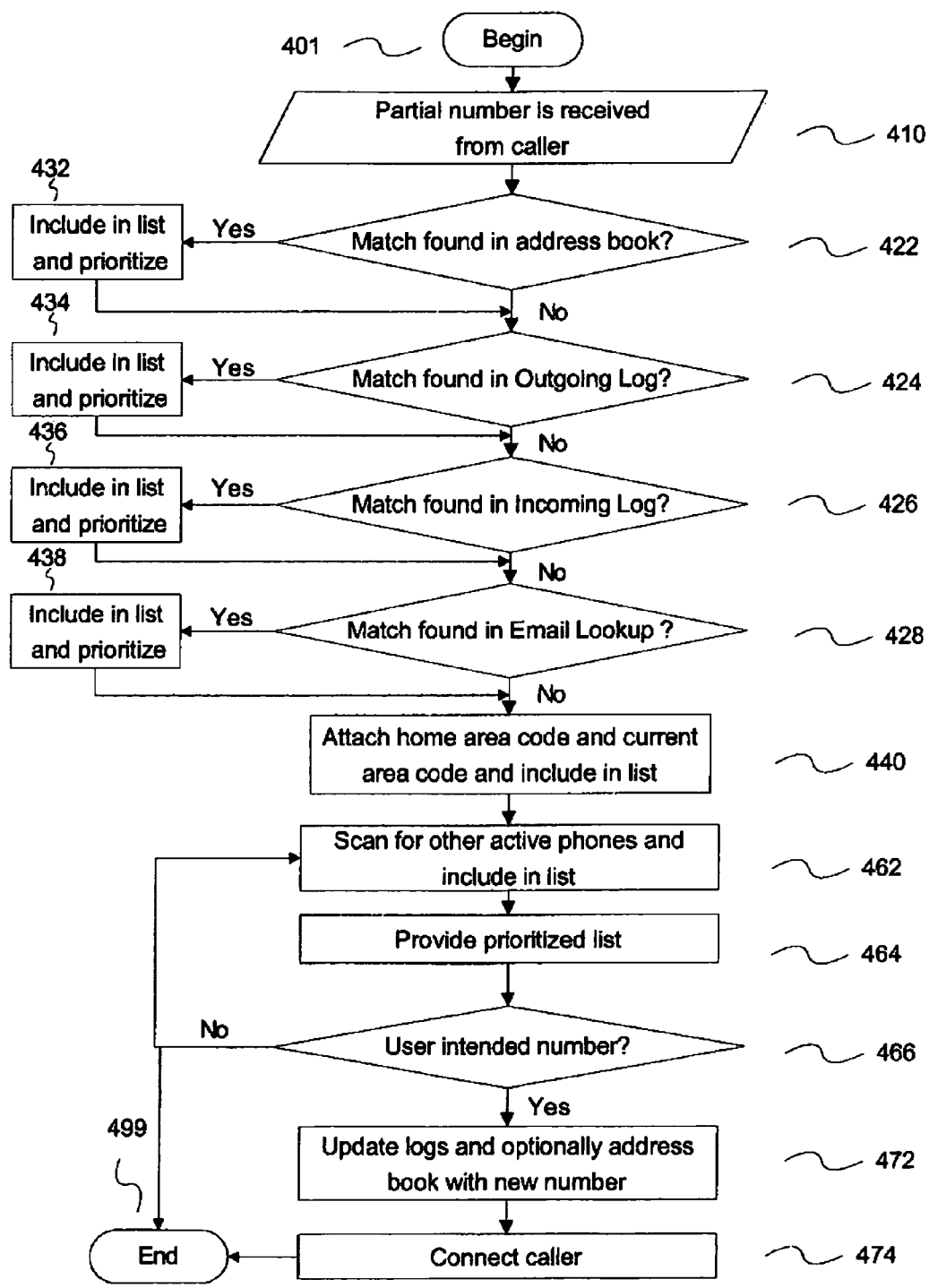
FIG. 4 illustrates a flowchart of yet another embodiment of a method for determining a user intended number in accordance with the present invention.

FIG. 4 illustrates a flowchart of a method 400 for determining a user intended number in accordance with the present invention. Method 400 begins at step 401.

A partial phone number is received from a caller in step 410. In one embodiment, the partial phone number is a seven digit number entered into a mobile device. Method 400 has been configured to search the databases based on a user defined priority and to provide a prioritized selection list when multiple numbers are determined.

An address book of the mobile communication device is queried for a match to the partial phone number in step 422. If a matching number is found the number is included in a selection list and prioritized accordingly at step 432.

An outgoing phone log of the mobile communication device is queried for a match to the partial phone number in step 424. If a matching number is found the number is included in the selection list and prioritized accordingly at step 434.

An incoming phone log of the mobile communication device is queried for a match to the partial phone number in step 426. If a matching number is found the number is included in the selection list and prioritized accordingly at step 436.

A search of email text for a match to the partial phone number is performed in step 428. For example, an email received at the mobile communication device may contain a signature line with a contact phone number. If a matching phone number is found in any email text the number is included in the selection list and prioritized accordingly at step 438.

The caller's home area code, and current area code if the user is roaming, is attached to the partial phone number in step 440. The home area code number and current area code number, if applicable, are included in the selection list and prioritized accordingly.

A scan for other active phones is performed in step 462. In one embodiment, a scan for active cellular devices within the caller's geographic area is performed. Any active cellular devices matching the partial phone number are included in the selection list and prioritized accordingly. Alternatively, a business directory database may be scanned and queried for numbers matching the partial phone number.

At step 464, a prioritized list of phone numbers populated with numbers attained in steps 422 through 462 is provided to the user. In one embodiment, the list is presented as a text display at the mobile communication device. In another embodiment the list is presented audibly. In one embodiment, the priority of the numbers in the selection list is user defined. Alternatively, the numbers in the selection list are ordered according to the order the selection list was populated.

A determination of whether the selection list contains the user intended number is made in step 466. In one embodiment, if the correct number is not present in the selection list the scan in step 462 is performed again with a broader range of selection criteria to return additional matches and add the matches to the selection list. For example, the search criteria may be broadened to search numbers in additional area codes or in a wider geographic area. If a user intended number is not found after the search is broadened, method 400 ends at 499.

In one embodiment, when the user intended number has been determined in step 466, the mobile communication device call logs and address book are updated in step 472.

At step 474 a call to the user intended number is initiated. Method 400 ends at step 499.

Figure 5:
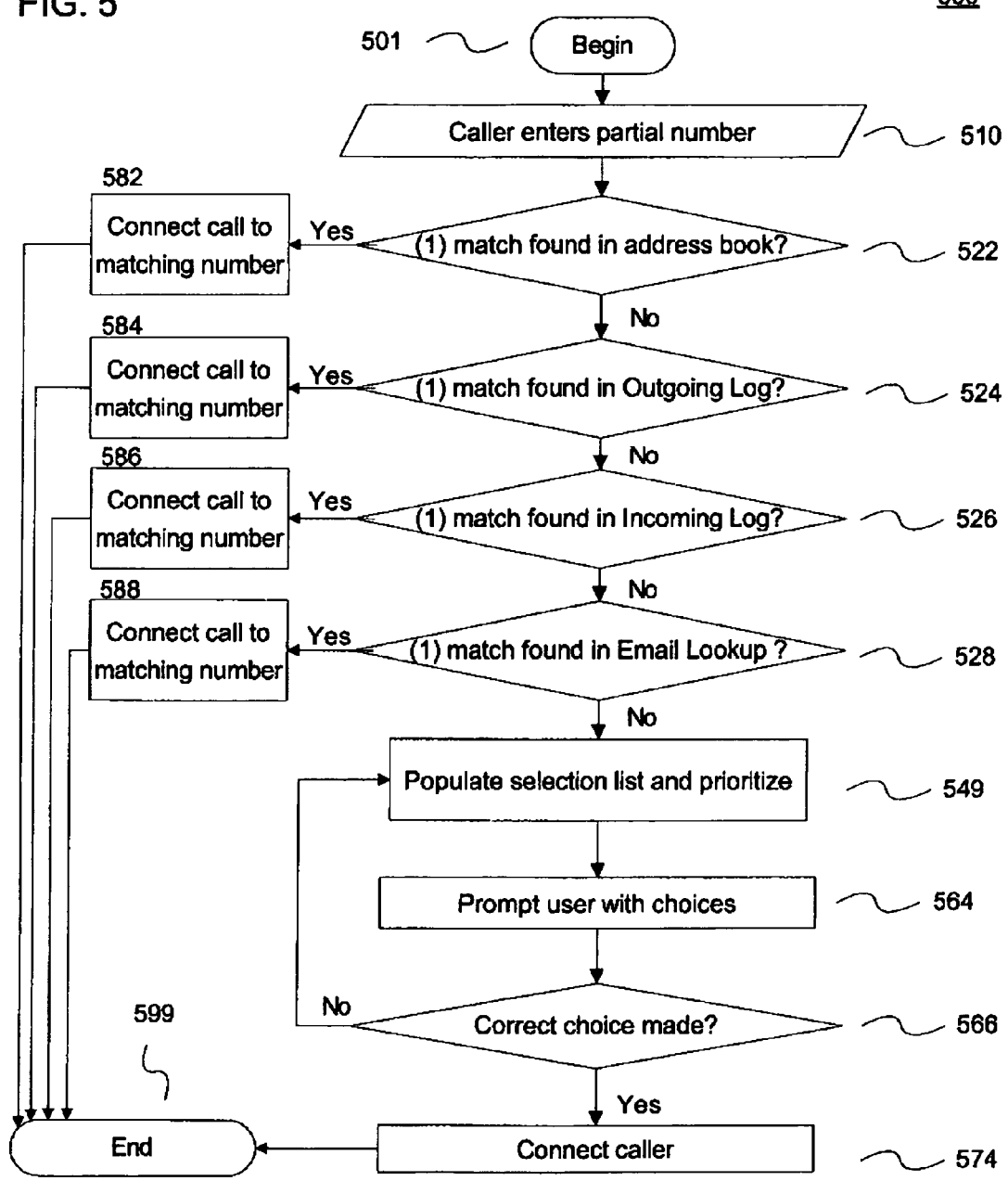
FIG. 5 illustrates a flowchart of another embodiment of a method for determining a user intended number in accordance with the present invention.

FIG. 5 illustrates a flowchart of another embodiment of a method 500 for determining a user intended number in accordance with the present invention. Method 500 begins at step 501. Method 500 has been configured to search the databases based on a user defined priority and to provide a prioritized selection list when multiple numbers are determined. As described in more detail below, method 500 has also been configured to automatically initiate a call to a number corresponding to the partial number when only one number is found is a database.

A partial phone number is received from a caller in step 510. In one embodiment, the partial phone number is a seven digit number entered into a mobile device.

An address book of a mobile communication device is queried for a match to the partial phone number in step 522. If a single matching number is found the matching number is automatically dialed in step 582. If no match is found, or more than one match is found, the method continues to search for matching numbers. In another embodiment, if more than one match is found, the method may jump to step 549 and populate the prioritized selection list with results from the query in step 522.

An outgoing phone log of the mobile communication device is queried for a match to the partial phone number in step 524. If a single matching number is found the matching number is automatically dialed in step 584. If no match is found, or more than one match is found, the method continues to search for matching numbers. In another embodiment, if more than one match is found, the method may jump to step 549 and populate the selection list with results from the query in step 524.

An incoming phone log of the mobile communication device is queried for a match to the partial phone number in step 526. If a single matching number is found the matching number is automatically dialed in step 586. If no match is found, or more than one match is found, the method continues to search for matching numbers. Alternatively, if more than one match is found, the method may jump to step 549 and populate the selection list with results from the query in step 526.

A search of email text for a match to the partial phone number is performed in step 528. For example, an email received at the mobile communication device may contain a signature line with a contact phone number. If a single matching number is found the matching number is automatically dialed in step 588. For those with experience in the art, voice numbers can be easily differentiated from fax numbers, both of which are common elements in email signature lines. If no match is found, or more than one match is found, the method continues to search for matching numbers. In another embodiment, if more than one match is found, the method may jump to step 549 and populate the selection list with results from the query in step 528.

A selection list is populated and prioritized in step 549. In one embodiment, the selection list contains only multiple results from the highest priority query. Alternatively, the selection list may contain results from multiple queries if an automatic call connection could not be performed.

A list of determined numbers is provided to the user at step 464.

At step 566, a determination of whether the selection list contains a user intended number is made. In one embodiment, if the correct number is not present in the selection list, the population of the list in step 549 is performed again with a broader range of selection criteria to return additional matches and add the matches to the selection list. In one embodiment, the re-population of the selection list is implemented as in step 462.

When the user intended number has been determined in step 566, the call to the user intended number is initiated in step 574. Method 500 ends at step 599.

Those with skill in the art will recognize that the system and methods described above may be used to determine user intended phone numbers in situations different than those described. For example, a user of a mobile communication device may be traveling to an unfamiliar location and need to call a pharmacy located in the area. The user only has a partial phone number of 933-3333, which lacks the area code. In this situation, searching the mobile communication device call logs and address book would not be fruitful. In this situation, searching other databases would be more likely to return the complete user intended number.

In such a situation, after the user enters the partial seven digit number at mobile communication device 110, software embedded in the mobile communication device has been user configured to transmit the number via wireless network 120 to telecommunications server 126. The telecommunications server queries database 122, 124, 132 and/or 136 for numbers matching the 933-3333 partial phone number. In one embodiment, the server narrows the query results by searching area codes in geographic proximity to the mobile communication device location. Alternatively, the query could be narrowed to area codes proximate to the mobile communication device home area code. In other embodiments, the query could be narrowed by accessing a database containing a corporate contact list, or other subset of all possible complete telephone numbers. In another example, the telecom server may also query an HLR cellular roaming database to search for cell phones roaming in the geographic proximity.

The telecommunications server 126 compiles a list of complete telephone numbers as a result of the one or more queries and transmits the list via the wireless network to the mobile communication device. Continuing with the present example, the telecommunications server found three 933-3333 telephone numbers in the user's surrounding geographical area and a roaming cell phone in the area with a 933-3333 number. In one embodiment, the list includes the names of the party associated with each returned number. In one embodiment, the determined number list with corresponding names is sent as a text file and displayed on the mobile communication device for the user to choose the intended complete telephone number. In this example, the intended number of the pharmacy is displayed on the provided list and the number is then selected by the user to complete a call via the cellular network to the intended number.

Those with skill in the art will recognize that the above methods and systems may be implemented with devices other than a mobile communication device such as a cell phone. Thus, in another embodiment of the invention, communications device 110 is implemented as a computer or similar device that connects across a network to any other device using a partial number. In another embodiment, the above-described methods are applied to partially known Internet protocol (IP) or MAC addresses. In another embodiment, the above-described methods are applied using a WiFi enabled device, such as, for example, a computer implemented toy. In an example, the computer implemented toy is a FURBY® plush toy. In another embodiment the communication device comprises a family of like devices that communicate via a header address that identifies the 'family', which are then uniquely identified by, for example, a serial number or some other unique identifier. Communications activity could then be performed between the family of devices, without human intervention based on these partial "telephone numbers" that identify them, providing for future direct unique device to device communication.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A computer implemented method for disambiguating a partial phone number, the method comprising:
   prioritizing an order of searching at least two databases;
   receiving a partial telephone number;
   determining that the partial phone number corresponds to at least one telephone number among the at least two databases, based on the order of searching the at least two databases;
   wherein the partial phone number is missing at least one digit to be a telephone number, and has at least two consecutive numbers in common with the telephone number;
   responsive to the determination that the partial phone number corresponds to the at least one telephone number, performing a system action, wherein the system action is selected from the group consisting of
      dialing the at least one telephone number, wherein the at least one telephone number is a determined user intended number;
      presenting a single telephone number corresponding to the at least one telephone number; and
      presenting at least two telephone numbers according to the order of searching.

2. The computer implemented method of claim 1, wherein the system action selected from the group is presenting the at least two telephone numbers according to the order of searching.

3. The computer implemented method of claim 2, further comprising:
   receiving a rejection of the at least two telephone numbers;
   scanning a selection criteria broader than the at least two databases; and
   presenting an additional telephone number in response to scanning.

4. The computer implemented method of claim 3, wherein the at least two databases comprise a database selected from the group consisting of a residential directory and a business telephone number directory.

5. The computer implemented method of claim 3, wherein the at least two databases comprise a cell phone stored database and a network stored database.

6. The computer implemented method of claim 1, wherein the one selected from the group is presenting at least two telephone numbers according to the order of searching, and wherein prioritizing the order of searching is determined by the user.

7. The computer implemented method of claim 6, wherein the first database is the user address book and the second database is stored email.

8. A computer program product for disambiguating a partial phone number, the program product comprising: a computer readable storage medium;
   first program instructions to prioritize an order of searching at least two databases;
   second program instructions to receive a partial telephone number;
   third program instructions to determine that the partial phone number corresponds to at least one telephone number among the at least two databases;
   wherein the partial phone number is missing at least one digit to be a telephone number, and has at least two consecutive numbers in common with the telephone number;
   responsive to the determination that the partial phone number corresponds to the at least one telephone number, fourth program instructions to perform a system action, wherein the system action is selected from the group consisting of
      dialing the at least one telephone number, wherein the at least one telephone number is a determined user intended number;
      presenting a single telephone number corresponding to the at least one telephone number; and
      presenting at least two telephone numbers according to the order of searching;
   wherein the first, second, third and fourth program instructions are stored on the computer readable storage medium.

9. The computer program product of claim 8, wherein the system action is selected from the group is presenting the at least two telephone numbers according to the order of searching.

10. The computer program product of claim 9, further comprising:
   fifth program instructions to receive a rejection of the at least two telephone numbers;
   sixth program instructions to scan a selection criteria broader than the at least two databases; and
   seventh program instructions to present an additional telephone number in response to scanning; and wherein fifth, sixth and seventh program instructions are stored on the computer readable storage medium.

11. The computer program product of claim 10, wherein the at least two databases comprise a database selected from the group consisting of a residential directory and a business telephone number directory.

12. The computer program product of claim 10, wherein the at least two databases comprise a cell phone stored database and a network stored database.

13. The computer program product of claim 8, wherein the one selected from the group is presenting at least two telephone numbers according to the order of searching, and wherein prioritizing the order of searching is determined by the user.

14. The computer program product of claim 13, wherein the first database is the user address book and the second database is stored email.

15. A computer system for disambiguating a partial phone number, the system comprising: a processor, a computer readable memory and a computer readable storage medium;
   first program instructions to prioritize an order of searching at least two databases;
   second program instructions to receive a partial telephone number;
   third program instructions to determine that the partial phone number corresponds to at least one telephone number among the at least two databases;
   wherein the partial phone number is missing at least one digit to be a telephone number, and has at least two consecutive numbers in common with the telephone number;
   responsive to the determination that the partial phone number corresponds to the at least one telephone number, fourth program instructions to perform a system action, wherein the system action is selected from the group consisting of
      dialing the at least one telephone number, wherein the at least one telephone number is a determined user intended number;
      presenting a single telephone number corresponding to the at least one telephone number; and presenting at least two telephone numbers according to the order of searching;

wherein the first, second, third and fourth program instructions are stored on the computer readable storage medium for execution by the processor via the computer readable memory.

16. The computer system of claim 15, wherein the system action is selected from the group is presenting the at least two telephone numbers according to the order of searching.

17. The computer system of claim 16, further comprising:
fifth program instructions to receive a rejection of the at least two telephone numbers;
sixth program instructions to scan a selection criteria broader than the at least two databases; and
seventh program instructions to present an additional telephone number in response to scanning; and wherein fifth, sixth and seventh program instructions are stored on the computer readable storage medium for execution by the processor via the computer readable memory.

18. The computer system of claim 17, wherein the at least two databases comprise a database selected from the group consisting of a residential directory and a business telephone number directory.

19. The computer system of claim 17, wherein the at least two databases comprise a cell phone stored database and a network stored database.

20. The computer system of claim 15, wherein the one selected from the group is presenting at least two telephone numbers according to the order of searching, and wherein prioritizing the order of searching is determined by the user.

* * * * *